United States Patent
Wulff

(10) Patent No.: US 7,492,123 B2
(45) Date of Patent: Feb. 17, 2009

(54) DEVICE AND METHOD FOR BATTERY REMOVAL FROM A MOBILE DEVICE

(75) Inventor: Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/472,206

(22) Filed: Jun. 21, 2006

(65) Prior Publication Data
US 2008/0007209 A1    Jan. 10, 2008

(51) Int. Cl.
*H01M 10/46*   (2006.01)
(52) U.S. Cl. .................................................. 320/107
(58) Field of Classification Search ............ 320/107, 320/112; 439/345, 346; 429/96, 97, 98, 429/99, 100
See application file for complete search history.

(56) References Cited

U.S. PATENT DOCUMENTS

| | | | | |
|---|---|---|---|---|
| 5,202,197 | A |   | 4/1993  | Ansell et al. |
| 5,608,304 | A | * | 3/1997  | Okumura ................... 320/134 |
| 5,762,512 | A | * | 6/1998  | Trant et al. ................. 439/347 |
| 6,002,236 | A | * | 12/1999 | Trant et al. ................. 320/114 |
| 2005/0003266 | A1 |   | 1/2005 | Wulff |

* cited by examiner

*Primary Examiner*—Edward Tso
(74) *Attorney, Agent, or Firm*—Fay Kaplun & Marcin, LLP

(57) ABSTRACT

Described is a system and method for battery removal in a mobile device. The system comprises a battery receiving chamber receiving a battery to power the device and a suspension mechanism holding the battery in the battery receiving chamber, the suspension mechanism releasing the battery after receiving a signal. The method comprises determining if a mobile device is shut down and releasing a power supply from a suspension mechanism after the mobile device is shut down.

20 Claims, 2 Drawing Sheets

DEVICE AND METHOD FOR BATTERY REMOVAL FROM A MOBILE DEVICE

BACKGROUND

All mobile devices require batteries for power. Before removing the battery from a mobile device, a user should properly shut down all running applications and shut down the device itself. However, in operation, users do not always follow this proper procedure and remove the battery without performing proper shut down procedures. If the battery is removed from the mobile device without a graceful shutdown, the mobile device may experience loss and corruption of its data and/or applications.

SUMMARY OF THE INVENTION

The present invention relates to a system and method for battery removal in a mobile device. The system comprises a battery receiving chamber receiving a battery to power the device and a suspension mechanism holding the battery in the battery receiving chamber, the suspension mechanism releasing the battery after receiving a signal. The method comprises determining if a mobile device is shut down and releasing a power supply from a suspension mechanism after the mobile device is shut down.

DETAILED DESCRIPTION

Figure 1:
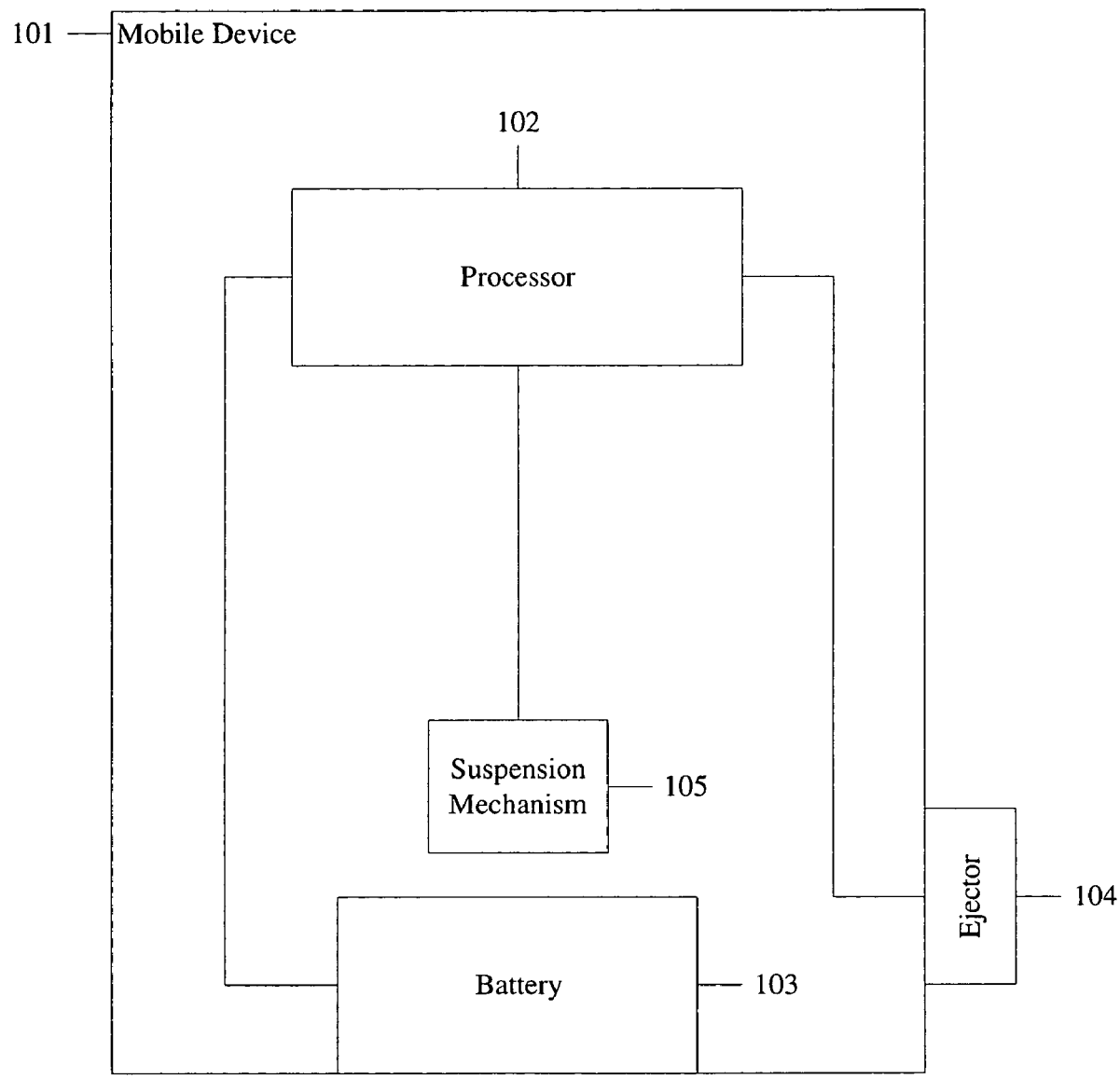
FIG. 1 illustrates an exemplary embodiment of a mobile device with a suspension mechanism according to the present invention.

The present invention may be further understood with reference to the following description and the appended drawings, wherein like elements are referred to with the same reference numerals. The exemplary embodiment of the present invention describes a method for releasing a battery in a mobile device using a suspension mechanism. The suspension mechanism performs the battery release as a function of time that is based on the length of time necessary to properly shut down applications running on the mobile device and the shut down of the mobile device itself. The suspension mechanism and the functionality will be discussed in detail below. The present invention may be applied to any type of mobile device having a battery, for example, mobile phones, handheld computing devices, personal digital assistants, etc.

Battery removal detection systems not only warn the mobile device that the battery is being removed, but also should have the ability to vary and adjust the amount of required forewarning time to shut down the mobile device based on the installed customer applications. Thus, the exemplary embodiments of the present invention provide a battery removal detection system for mobile devices that perform according to a function of time based on a shut down protocol for the mobile device and the currently running applications.

FIG. 1 illustrates an exemplary embodiment of a mobile device 101 with a suspension mechanism 105 according to the present invention. The mobile device 101 includes a battery 103. The exemplary embodiment of the mobile device 101 has an internal cavity to hold the battery 103. However, those of skill in the art will understand that the battery 103 may be placed internally or externally depending on the architecture of the mobile device 101. The battery 103 may be any type of portable power supply including but not limited to nickel cadmium, nickel hydride, alkaline, lithium polymer, and lithium ion, both rechargeable and non-rechargeable.

The battery 103 supplies power to the processor 102. The processor 102 manages the various components within the mobile device 101. For example, the processor 102 may be responsible for controlling the amount of energy drawn from the battery 103 to provide to the various components attached to it. The various components that may connect to the battery 103 include but are not limited to a processor, a light and/or sound emitting component, a keypad, a display, and a recharging unit. It should be noted that the configuration of FIG. 1 is exemplary only and that other configurations exist.

The exemplary embodiment of the mobile device 101 includes a suspension mechanism 105. The suspension mechanism 105 prevents the battery 103 from being improperly removed. The suspension mechanism 105 holds the battery 103 so that a user may not remove it until the suspension mechanism 105 releases the battery 103. This process begins when a user pushes an ejector button 104 which notifies the processor 102 that the user desires to remove the battery. It should be noted that the use of the ejector button 104 is exemplary only. For example, the process to remove the battery does not require an ejector button 104, but may be accomplished by coupling this process to a power button or by having an on board application that the user may select from the keypad or display. For example, by pushing the power button for an extended period of time to shut down the mobile device 101, the processor 102 may also perform the battery removal process.

The suspension mechanism 105 may perform the above described function in various manners. For example, the suspension mechanism 105 may include a solenoid. A solenoid includes a loop of wire, often wrapped around a metallic core, that produces magnetic fields when an electrical current is passed through it. The magnetic field that is generated is used to move a metallic object that is also included in the solenoid. Thus, a solenoid uses an electromagnet to mechanically perform a function. One feature of the solenoid is that it may control the magnetic fields created around it. By controlling the magnetic fields created, the solenoid may push or pull, magnetically, the metallic object.

The solenoid (i.e., suspension mechanism 105) in the exemplary embodiment creates a magnetic field by drawing energy from the battery 103. The current that passes through the solenoid creates the magnetic field. This magnetic field moves the metallic object which holds the battery 103 in place. In addition, the solenoid prevents the battery 103 from improper removal. The metallic object may be, for example, a hook that holds a loop located on the battery 103, a button that is inserted into a hole located on the battery 103, a flat panel sealing an insertion port for the battery 103, etc. According to the exemplary embodiment of the present invention, a user pushes the ejector button 104 that sends a signal to the processor 102. Once the processor 102 determines that the mobile device 101 and its running applications have been properly shut down, the battery 103 stops providing energy to the suspension mechanism 105. This effectively collapses the magnetic fields that were created. The collapse of the magnetic fields allows the metallic object of the solenoid to return to a rest position. Thus, the battery 103 may be removed. Those skilled in the art will understand that the solenoid may also properly remove the battery 103 through the application of power (i.e., the inverse process of shutting down the solenoid). For example, once the processor 102 determines that the mobile device 101 and its running applications have been properly shut down, the battery 103 provides energy to the suspension mechanism 105. Once the solenoid retracts, the battery 103 may be removed.

In another embodiment of the present invention that includes a suspension mechanism 105 that is a solenoid, the mobile device 101 also includes a mechanical back-up release system. The mechanical back-up release system is employed in the case where the solenoid fails. For example, the mechanical back-up release system that is employed may be a clamp as will be discussed below. Another example of the mechanical back-up release system is when the solenoid cannot be properly shut down. In such a case, a paper clip solenoid release system is employed. In the paper clip solenoid release system, a user pushes a button about the size of a pinhead (e.g., preferably using the tip of a paper clip). This button then effectively shuts down the suspension mechanism 105, either directly or indirectly. For example, the button may initiate a short out of the circuit that supplies energy to the solenoid so that the magnetic field collapses. In another example, the button may use a pushing mechanism that pushes the battery out at a force greater than an opposing force that holds the battery 103. In another example, the button may mechanically release the battery retention mechanisms.

In yet another exemplary embodiment of the present invention, the suspension mechanism 105 may perform its function electro-mechanically. For example, the suspension mechanism 105 may be an electrically operated clamp. In this embodiment of the present invention, the clamp is inaccessible by a user. This allows a further measure to prevent any improper removal of the battery 103 unless the clamp releases it. Functioning similarly to the solenoid example described above, a user pushes the ejector button 104 sending a signal to the processor 102. Once the processor 102 determines that the mobile device 101 and its running applications have been properly shut down, the processor 102 sends a signal to the clamp to open (e.g., by providing energy for the clamp to move from a locked position to an open position). The clamp then opens to release the battery 103. As described above, a mechanical back-up release system may be included in the mobile device 101 that uses a suspension mechanism 105 that is a clamp. Using the above described paper clip release system, a user may push a button that initiates a mechanical opening of the clamp.

In yet another exemplary embodiment of the present invention, the suspension mechanism 105 may be actuated by a dynamic alloys. Dynamic alloys contract when electrically driven. Electrical currents heat the dynamic alloy, causing it to restructure its internal molecular and crystalline form, thereby changing its physical shape. This change in physical shape may be utilized to retain or eject the battery in a substantially similar fashion as discussed above with the exemplary embodiments of the present invention, e.g., clamping the battery, hooking the battery, etc.

It should be noted that in all the exemplary embodiments described above, the suspension mechanism 105 may be used in conjunction with any existing mechanical devices used for battery removal. For example, the battery 103 may contain a dual latch system. The dual latch system forces a user to first unlatch the battery 103 to allow it to fall a certain length not to exceed the length of the battery 103. Then, a second latch forces a user to further unlatch the battery (usually the latch is located on the battery 103 itself) so that it may be completely removed. In this exemplary embodiment using the dual latch system, the suspension mechanism 105 serves as a primary removal step. The dual latch system provides secondary and tertiary removal steps. The suspension mechanism 105 prevents any of the removal process from the dual latch system until the suspension mechanism 105 is shut down. Only upon shutting down the suspension mechanism 105 is the dual latch system effective.

It should also be noted that the suspension mechanism 105 is not limited to a solenoid and a clamp and that other suspension mechanisms exist. For example, the suspension mechanism 105 may be a preventive measure. As a preventive measure, the suspension mechanism 105 does not allow a user to operate the battery removal system (e.g., dual latch system) that exists on the mobile device 101. In such an embodiment, the ejector button 104 would not be necessary. Only if the suspension mechanism 105 allows the battery removal system from operating will the user be able to remove the battery 103.

Figure 2:
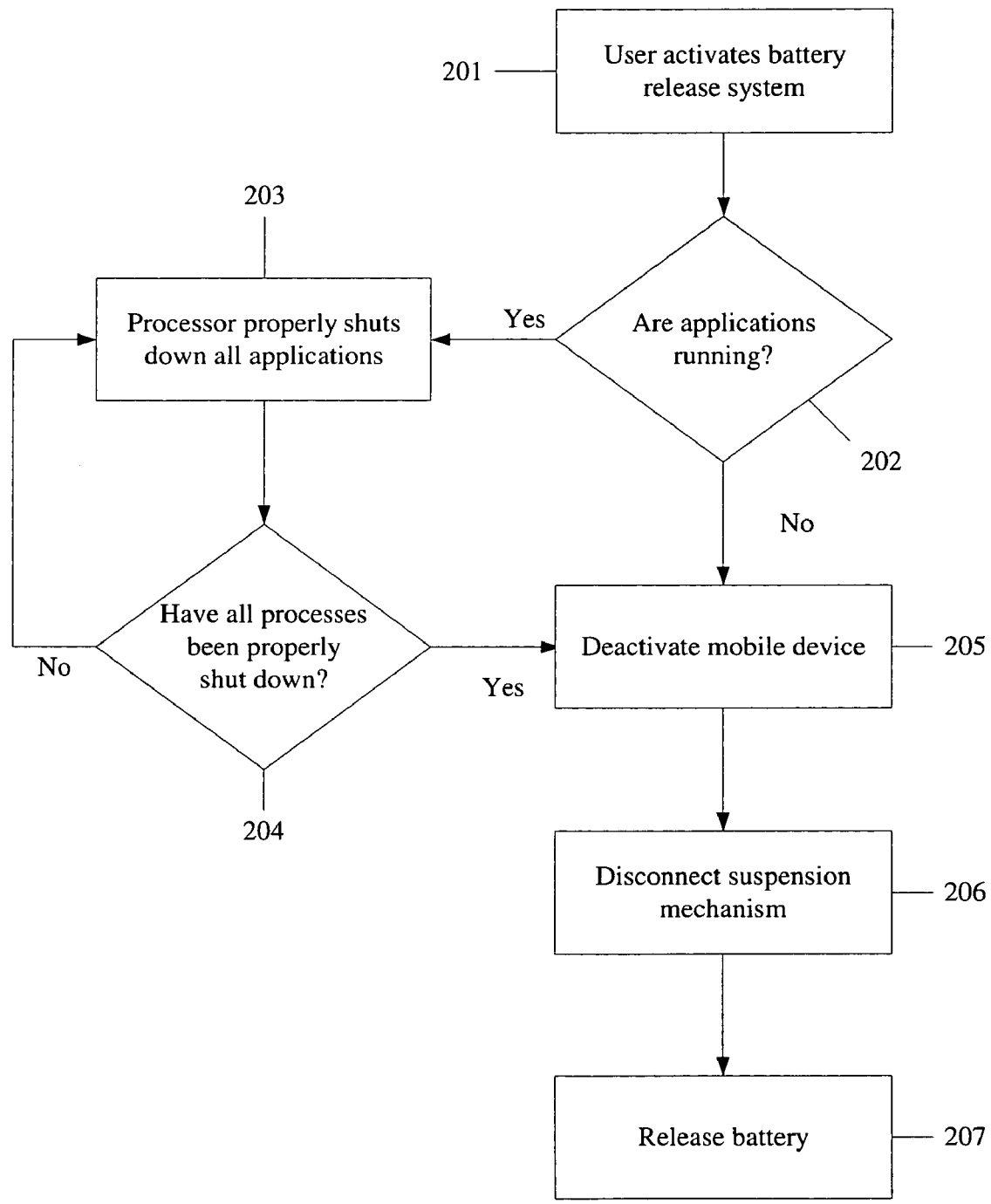
FIG. 2 illustrates an exemplary method of releasing a battery according to the present invention.

FIG. 2 illustrates an exemplary embodiment of a battery removal method 200. The battery removal method 200 will be discussed with reference to the mobile device 101 and its components described above with reference to FIG. 1. Initially, in step 201, a user activates a battery release mechanism. The battery release mechanism may be the ejector button 104. The processor 102 may trigger the battery release mechanism upon certain actions taken by the user (e.g., initiating a shut down sequence, pushing a power button, etc.). The activation of the battery release mechanism sends a signal to the processor 102.

When the signal is sent to the processor 102, the processor 102 performs step 202 and determines if applications are running on the mobile device 101. If no applications are running, the process continues to step 205 where the mobile device 101 is shut down. This allows the process to proceed to step 206 where the suspension mechanism 105 is shut down. If applications are not running on the mobile device 101, the processor 102 concludes that data and/or applications that may run on the mobile device 101 have already been properly shut down. The proper shut down prevents any loss and/or corruption of data on the mobile device 101.

It should be noted that in the exemplary embodiment, the suspension mechanism 105 is shown as connected to the processor 102. However, the suspension mechanism 105 may also be connected to the battery 103 to directly receive power from the battery 103 for operation of the suspension mechanism 105. For example, to change the state of the suspension mechanism 105, the processor 102 may send a signal to the battery 103 to stop powering the suspension mechanism 105 to release the battery. In another exemplary embodiment, there may be a power interface (not shown) that is controlled by the processor 102. The power interface may be connected to the battery 103 and distributes the battery power to components as needed. In another exemplary embodiment, the battery removal detection system described herein may include components separate from the processor 102 that can perform the described functionality.

However, if applications are running on the mobile device 101, the processor 102 concludes that data and/or applications running on the mobile device 101 have not been properly shut down. This step prevents the above described improper removal of the battery 103. With improper removal of the battery 103, applications that may be running will cease to operate and may cause loss and/or corruption of data on the mobile device 101. Thus, the process continues to step 203 where the processor 102 properly shuts down the all applications running on the mobile device 101. It is presumed that the user wishes to shut down the mobile device 101 and any running applications if the battery is to be removed. However, it should be noted that the present invention may also utilize a prompt to notify the user to properly shut down all running applications. Such a prompt would be helpful if, for example, the battery removal system was accidentally activated or the user was unaware of an application still running on the mobile device 101. Thus, with a prompt, the user performs the necessary steps in order to properly shut down all running applications.

The applications that are closed include all applications, whether the improper shut down of that application causes loss and/or corruption of data on the mobile device 101. Once the mobile device 101 has been satisfactorily shut down, a check is performed in step 204. If the processor 102 determines that the mobile device 101 is still running applications, then the process returns to step 203 and the mobile device 101 reattempts to properly shut down the mobile device 101 and its running applications. However, if the processor 102 determines that the mobile device 101 was properly shut down, then the process continues to step 205.

Upon determining that the mobile device 101 was properly shut down, in step 205, the mobile device 101 is deactivated. Thereafter, in step 206, the suspension mechanism 105 is shut down. The shut down of the suspension mechanism 105 depends on the manner in which the suspension mechanism 105 operates. For example, as described above, if the suspension mechanism 105 is a solenoid, then power is cut off from the solenoid to collapse the magnetic field that it generates. If the suspension mechanism 105 is a clamp, then a signal is sent to open the clamp to release the battery 103. Thus, after the suspension mechanism 105 is shut down in step 206, the battery 103 is released in step 207.

Those of skill in the art will understand that the shut down of the suspension mechanism 105 in step 206 becomes a function of a time necessary to properly shut down the mobile device 101. For example, if there are numerous applications running on the mobile device 101, then the amount of time it takes for the suspension mechanism 105 to release the battery 103 is relatively long. In contrast, if there are only a few applications running on the mobile device 101, then the amount of time it takes for the suspension mechanism 105 to release the battery 103 is relatively short. As described above, in the case where no applications are running on the mobile device 101, as determined in step 202, then the amount of time it takes for the suspension mechanism 105 to release the battery 103 is little to none.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A device, comprising:
a battery receiving chamber receiving a battery to power the device; and
a suspension mechanism holding the battery in the battery receiving chamber, the suspension mechanism releasing the battery after receiving a signal.

2. The device of claim 1, wherein the battery receiving chamber is one of an internal chamber of the device and an external chamber of the device.

3. The device of claim 1, wherein the signal is received after the device has been shut down.

4. The device of claim 1, further comprising:
a processor generating the signal.

5. The device of claim 4, wherein the processor generates the signal after shutting down running applications.

6. The device of claim 4, wherein the processor generates the signal after shutting down the device.

7. The device of claim 1, further comprising:
an ejector receiving input from a user initiating a battery removal process.

8. The device of claim 7, wherein the ejector is one of an ejection button and a power button.

9. The device of claim 1, wherein the suspension mechanism includes an electro-mechanical apparatus preventing the battery from removal.

10. The device of claim 9, wherein the electro-mechanical apparatus includes one of a solenoid, a clamp, and a dynamic alloy.

11. The device of claim 1, further comprising:
a mechanical back-up release system that releases the battery upon failure of the suspension mechanism.

12. A method, comprising:
determining if a mobile device is shut down; and
releasing a power supply from a suspension mechanism after determining the mobile device is shut down.

13. The method of claim 12, further comprising:
prompting a user to properly shut down the mobile device.

14. The method of claim 12, wherein the suspension mechanism includes one of a solenoid, a clamp, and a dynamic alloy.

15. The method of claim 12, wherein shut down includes closing all running applications.

16. A device, comprising:
a battery chamber receiving a battery; and
a battery holding means for holding the battery in the battery chamber until a signal is received to release the battery from the chamber.

17. The device of claim 16, further comprising:
an ejector means for initiating release of the battery from the chamber.

18. The device of claim 16, further comprising:
a shut down means for shutting down running applications of the device.

19. The device of claim 16, wherein the signal is a turning off of power to the battery holding means.

20. The device of claim 16, wherein the signal is a turning on of power to the battery holding means.

* * * * *